United States Patent
Dunmire et al.

(10) Patent No.: US 10,798,242 B2
(45) Date of Patent: *Oct. 6, 2020

(54) CALL VOLUME REDUCTION BASED UPON A PROPENSITY TO CALL IN CONNECTION WITH A REASON CODE

(71) Applicant: AT&T Intellectual Property I, L.P., Atlanta, GA (US)

(72) Inventors: David Dunmire, Dallas, TX (US); Sanjay Krishna, Johns Creek, GA (US); Don Green, Smyrna, GA (US); John Roberts, Marietta, GA (US); Anna Aspley, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,943

(22) Filed: Sep. 9, 2019

(65) Prior Publication Data

US 2019/0394332 A1    Dec. 26, 2019

Related U.S. Application Data

(63) Continuation of application No. 16/005,479, filed on Jun. 11, 2018, now Pat. No. 10,412,218, which is a
(Continued)

(51) Int. Cl.
*H04M 3/51*    (2006.01)

(52) U.S. Cl.
CPC ....... *H04M 3/5158* (2013.01); *H04M 3/5183* (2013.01); *H04M 2203/555* (2013.01)

(58) Field of Classification Search
CPC . H04M 3/5183; H04M 3/5238; H04M 3/5158
See application file for complete search history.

(56) References Cited

U.S. PATENT DOCUMENTS 6,438,545 B1    8/2002    Beauregard et al.
6,542,601 B1    4/2003    Hernandez et al.
(Continued)

FOREIGN PATENT DOCUMENTS

EP    1244974    10/2002
KR    20090003435 A    1/2009

OTHER PUBLICATIONS

Weiss, Sholom M., and Chidanand V. Apte. "Automated generation of model cases for help-desk applications." IBM systems journal 41.3 (2002): 421-427. https://pdfs.semanticscholar.org/b606/39ff8269bb7b5b936a183ad6ab5603359f4b.pdf.
(Continued)

*Primary Examiner* — Nafiz E Hoque

(57) ABSTRACT

Devices, computer-readable media and methods for delivering customer service content associated with a reason code are disclosed. Examples of the present disclosure may include a processor of a telecommunication network identifying a reason code associated with calls from customers to a customer call center and determining a set of shared traits among the customers. The shared traits may be based upon first network event data and first customer account data associated with the customers. The processor may further determine a customer with a propensity to call score that exceeds a threshold and with a customer profile that matches the set of shared traits. The customer profile may be based upon second network event data and second customer account data associated with the customer. The processor may further deliver a customer service content associated with the reason code to the customer via a communication modality that is determined for the customer.

20 Claims, 3 Drawing Sheets

Related U.S. Application Data continuation of application No. 15/375,503, filed on Dec. 12, 2016, now Pat. No. 9,998,596.

(56) References Cited

U.S. PATENT DOCUMENTS

| | | | |
|---|---|---|---|
| 7,099,456 B2 | 8/2006 | Zama | |
| 7,343,406 B1* | 3/2008 | Buonanno | G06Q 10/06 |
| | | | 705/1.1 |
| 7,593,522 B2 | 9/2009 | Parker-Stephen | |
| 7,760,857 B2 | 7/2010 | Vetter et al. | |
| 7,783,029 B2 | 8/2010 | Whitecotten et al. | |
| 7,818,195 B2 | 10/2010 | Coon et al. | |
| 7,818,631 B1* | 10/2010 | Halikhedkar | H04Q 3/0075 |
| | | | 714/48 |
| 7,826,597 B2 | 11/2010 | Berner et al. | |
| 7,949,122 B1 | 5/2011 | Taylor et al. | |
| 7,983,411 B2 | 7/2011 | Huet et al. | |
| 8,073,777 B2 | 12/2011 | Barry et al. | |
| 8,170,197 B2 | 5/2012 | Odinak | |
| 8,223,953 B2 | 7/2012 | Houmaidi et al. | |
| 8,275,117 B2 | 9/2012 | Huet et al. | |
| 8,521,572 B2* | 8/2013 | Hanson | G06Q 30/02 |
| | | | 379/265.03 |
| 8,824,662 B2 | 9/2014 | Martin | |
| 8,965,784 B2 | 2/2015 | Postrel | |
| 9,036,808 B2 | 5/2015 | Kelley et al. | |
| 9,124,694 B2 | 9/2015 | Monegan et al. | |
| 9,137,373 B2 | 9/2015 | Conway et al. | |
| 9,160,852 B2 | 10/2015 | Ripa et al. | |
| 9,342,353 B2 | 5/2016 | Cherel et al. | |
| 9,467,567 B1* | 10/2016 | Barkan | G06Q 10/00 |
| 2002/0087680 A1* | 7/2002 | Cerami | G06Q 10/087 |
| | | | 709/224 |
| 2002/0123983 A1 | 9/2002 | Riley et al. | |
| 2003/0200135 A1* | 10/2003 | Wright | G06Q 30/0201 |
| | | | 705/7.29 |
| 2010/0104086 A1* | 4/2010 | Park | G10L 15/04 |
| | | | 379/265.09 |
| 2013/0156171 A1* | 6/2013 | Springer | H04M 1/64 |
| | | | 379/88.22 |
| 2014/0143018 A1 | 5/2014 | Nies et al. | |

OTHER PUBLICATIONS

González, Luz Minerva, Ronald E. Giachetti, and Guillermo Ramirez. "Knowledge management-centric help desk: specification and performance evaluation." Decision support systems 40.2 (2005): 389-405. https://www.researchgate.net/profile/Ronald_Giachetti/publication/222832747_Knowledge_management-centric_help_desk_Specification_and_performance_evaluation/links/0046353c961bde5e7b000000.pdf.

Aguir, Salah, et al. "The impact of retrials on call center performance." OR Spectrum 26.3 (2004): 353-376. http://home.ku.edu.tr/zaksin/public_html/or165_2.pdf.

Ridley, Ahmad D., Michael C. Fu, and William A. Massey. "Customer relations management: call center operations: Fluid approximations for a priority call center with time-varying arrivals." Proceedings of the 35th conference on Winter simulation: driving innovation. Winter Simulation Conference, 2003 http://www.princeton.edu/~wmassey/Recent/Fu%20Massey%20Ridley.pdf.

Di Fabbrizio, Giuseppe, Dawn Dutton, Narendra K. Gupta, Barbara Hollister, Mazin G. Rahim, Giuseppe Riccardi, Robert E. Schapire, and Juergen Schroeter. "AT&t help desk." In INTERSPEECH. 2002. http://disi.unitn.it/~riccardi/papers/ttshelpdesk-icslp2002.pdf.

* cited by examiner

CALL VOLUME REDUCTION BASED UPON A PROPENSITY TO CALL IN CONNECTION WITH A REASON CODE

This application is a continuation of U.S. patent application Ser. No. 16/005,479, filed Jun. 11, 2018, now U.S. Pat. No. 10,412,218, which is a continuation of U.S. patent application Ser. No. 15/375,503, filed Dec. 12, 2016; now U.S. Pat. No. 9,998,596, all of which are herein incorporated by reference in their entirety.

The present disclosure relates generally to customer service troubleshooting for a telecommunication service provider network, and more particularly to automatically identifying customers who may have a high propensity to call a customer call center in connection with a reason code, and to delivering customer service content to those customers experiencing an event associated with the reason code to reduce the number of calls received at the customer call center.

BACKGROUND

Various types of businesses provide customer service agents for handling a variety of customer-facing issues. For example, a telecommunication network service provider may staff a customer call center with customer service agents for handling issues relating to billing, service disruption, adding and removing features from service plans, endpoint device troubleshooting, and so forth. In some cases, customers may contact the telecommunication network service provider by a telephone call to the customer call center. In other cases, the telecommunication network service provider may provide access to customer service agents via other communication channels, e.g., interacting with customer service agents who are available for network-based chat conversations, e.g., instant messages, text messages, emails, and so forth. However, each customer call or other customer contacts to a live customer service agent is costly in terms of personnel time.

SUMMARY

In one example, the present disclosure provides a device, computer-readable medium and method for delivering customer service content associated with a reason code. For example, a method may include a processor of a telecommunication network identifying a reason code associated with calls from customers to a customer call center and determining a set of shared traits among the customers. The shared traits may be based upon first network event data and first customer account data associated with the customers. The processor may further determine a customer with a propensity to call score that exceeds a threshold and with a customer profile that matches the set of shared traits. The customer profile may be based upon second network event data and second customer account data associated with the customer. The processor may further deliver a customer service content associated with the reason code to the customer via a communication modality that is determined for the customer.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
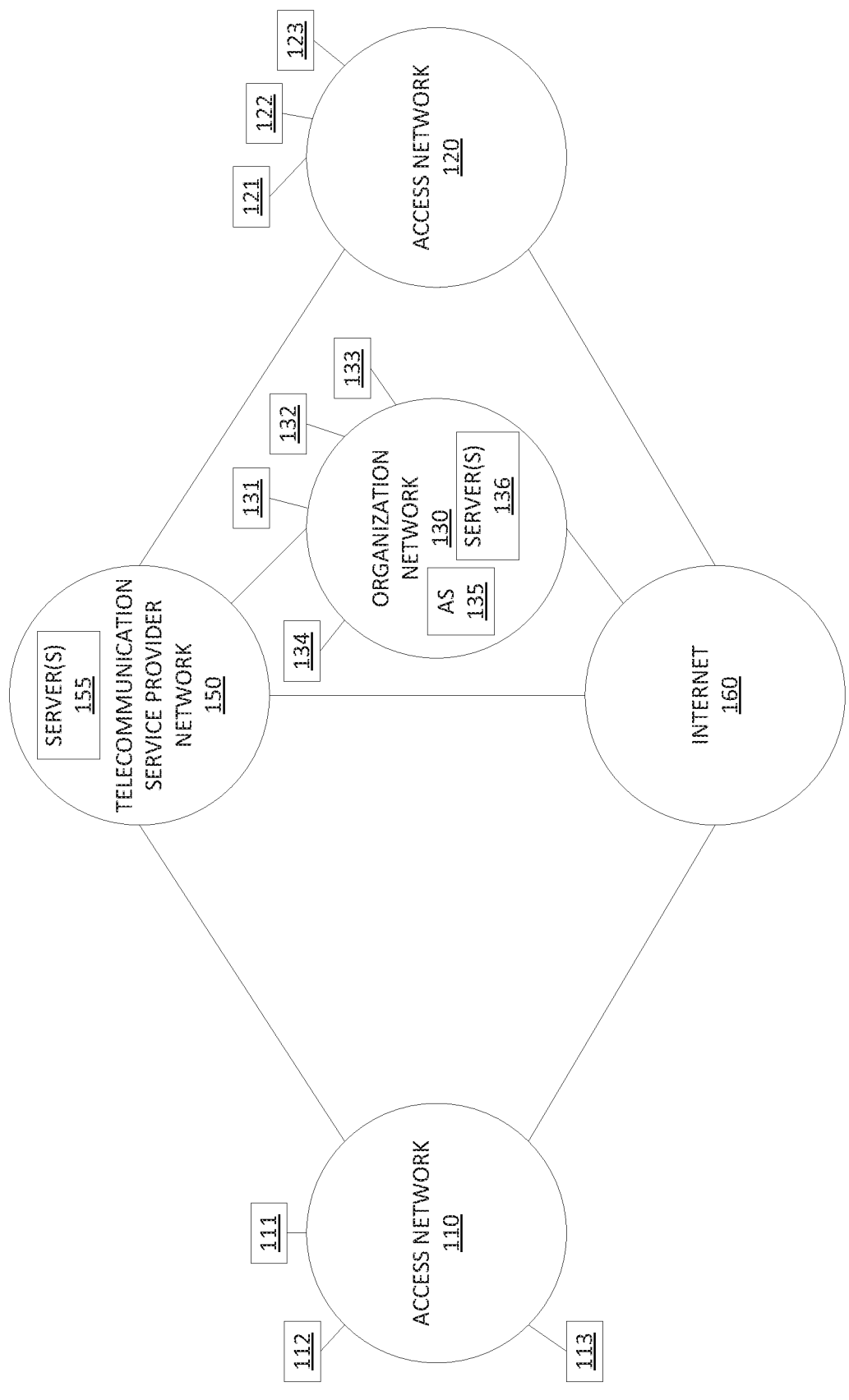
FIG. 1 illustrates one example of a system including a telecommunication service provider network, according to the present disclosure.

The present disclosure broadly discloses devices, non-transitory (i.e., tangible or physical) computer-readable media, and methods for delivering customer service content associated with a reason code. For example, customers, e.g., subscribers, may contact a customer call center of a telecommunication network for various issues relating to billing, service disruption, adding and removing features from service plans, endpoint device troubleshooting, and so forth. The customers may contact the customer call center via telephone, video call, or using a network-based chat interface, e.g., instant messages, text messages, emails, and so forth. However, each customer call or any other types of contact involving a live customer service agent will incur a significant cost in terms of personnel time. In addition, many of the issues the customers are calling about could be resolved by the customers themselves with proper guidance. For example, an inexperienced customer may have a simple problem relating to a disabled wireless network adapter that could be resolved with a few clicks through several menus on the customer's computer. However, the customer may call the customer call center believing there is a problem with the telecommunication network that the telecommunication network service provider can and should resolve. Examples of the present disclosure seek to identify customers who may be experiencing a customer event and who are likely to call a customer call center as a result, and to provide pertinent customer service content to the customer in order to both help the customer resolve the customer event quickly and to prevent an unnecessary call to be initiated by the customer to the customer call center.

In one example, a reason code associated with a number of calls to a customer call center is identified. For instance, the reason code may be identified when a number of calls associated with the reason code in a given time period exceeds a threshold, e.g., more than 200 calls in a day, more than 500 calls in a day, and so forth. The customer call center may utilize a number of reason codes to differentiate among the multitude of different reasons for which a customer may contact the customer call center. In one example, an agent may tag or categorize a record for a call to the customer call center with a reason code, e.g., at the end of the call or at a point during the call at which the agent is able to identify the purpose or reason for the call. Alternatively or in addition, a record for a call to the customer call center may be tagged with a reason code based upon a navigation of the calling customer through an interactive voice response (IVR) system, e.g., prior to being connected to a live agent. For instance, the customer may make one or more selections in response to prompts from the IVR system which indicate the customer's perceived reason for the call, which may then be mapped into a reason code.

In one example, a set of shared traits among a plurality of customers placing calls having call records tagged with the reason code is identified. In one example, the set of shared traits may be determined using a machine learning algorithm, e.g., a supervised learning algorithm. For instance, a set of training data may comprise network event data and customer account data associated with a plurality of customers. Customers who have made calls in connection with a particular reason code may be considered positive examples, and customers who have not called in connection with the particular reason code may be considered negative examples. In one example, the customers used as positive examples for the training data set may comprise customers associated with a sampling of calls to the customer call center within a given time period, e.g., every fifth call out of 100 calls associated with the reason code that were received within a 24 hour period, every tenth call, and so forth. In one example, all of the customers placing calls associated with the reason code in a given time period may comprise positive samples, and an equal number or a different number of, e.g., randomly selected, customers who did not make calls associated with the reasons code in the given time period may be selected as negative examples. In one example, the purpose of the machine learning algorithm is to generate a binary classifier, e.g., a linear binary classifier, such as a support vector machine (SVM) that may be used to identify other customers who may have similarities to those customers who have already made calls associated with the reason code.

In one example, the set of shared traits may be determined by first performing feature selection over a number of customer traits. The customer traits may comprise the contents of the network event data, e.g., "network events," and the contents of customer account data, e.g., "customer characteristics," associated with the customers. For example, customers who have called in connection with a reason code may experience similar network events which may be recorded in network event data, such as a number of dropped calls, a television service outage, reduced data speeds, and so forth. Thus, network event data may comprise call detail records (CDRs), logs, reports, and the like for data calls and cellular and/or landline telephone calls, collected from various network elements, trouble ticket system reports, billing system reports, provisioning system reports, and so forth, or aggregate records created from the foregoing types of logs, reports, records, etc. Network event data may also include clickstream data regarding the customers Internet usage, television viewing data and other television utilization data, and so forth.

In addition, customers who have called in connection with the reason code may share certain customer characteristics such as being within a particular age range, having the same or similar television viewing preferences, having the same or similar subscription plans, being within a same geographic area, having a same set top box model, router model, and so forth. For instance, the telecommunication network may keep records of customer characteristics in the customer account data comprising, name, age, gender, address, subscription information, identifications of customer devices, such as cellular telephones, routers, set top boxes, home gateways, private branch exchanges, customer edge routers, and so forth, billing history, payment history, purchasing and ordering information, and so forth. It should be noted that the examples and characterizations of various customer traits, e.g., network event data and customer account data, are provided for illustrative purposes only and it should be understood that other, further, and different examples in accordance with the present disclosure may categorize various types of customer traits in a different manner.

In one example, third party information records may also be utilized in connection with determining the set of shared traits. For example, the third party information records may identify the third parties called by or calling to a customer. Thus, the identities of such third parties may be considered as additional customer traits which may be used in determining the set of shared traits. For instance, if many customers who made calls associated with a reason code also were called by a particular third party, this customer trait of the respective customers may likely be included in the set of shared traits. In this regard, it should be noted that in one example, embodiments of the present disclosure, e.g. steps, functions, operations, etc., for automatically determining a set of customer traits which are indicative of a customer who is likely to be suffering from a problem associated with a reason code, for detecting customers having customer profiles that match the set of shared traits and who are also determined to be likely to call a customer call center regarding the problem, and for pushing automated customer service content to such customers in order to prevent unnecessary calls to the customer call center, are activated only for customers/subscribers who opt-in and provide consent. A non-exhaustive list of example data sources for customer account data, network event data, and third party information records is provided in the Appendix.

In one example, the feature selection may include reducing the number relevant features to those which are most useful in a classifier, e.g., a binary classifier to identify other customers who may have similarities to those customers who have already made calls associated with the reason code. Thus, for example, a customer trait, or "feature," with a higher number of positive examples may be selected for inclusion into the set of shared traits over a customer trait with fewer or no positive examples. However, it should be noted that a customer trait that is strongly associated with negative examples may also be included in the set of customer traits. For instance, if no customer in the training data set having a certain model of cellular telephone called the customer call center in regard to the reason code, this customer trait may comprise a strong feature for the binary decision making of the classifier and may also be selected for inclusion in the set of shared traits.

Alternatively, or in addition, a principal component analysis (PCA) may be applied to the training data set. For instance, PCA may be applied to a hyper-dimensional space of all of the possible features (e.g., customer traits) that may comprise the set of shared traits. In another example, PCA may be applied to a hyper-dimensional space based upon a reduced feature set. In one example, a hyperplane in the hyper-dimensional space (e.g., with or without PCA transformation) may be generated to represent an average of the values for various customer traits for all of the positive examples.

In one example, a testing data set may be used to verify the accuracy of the classifier. For example, customer account data and network event data for various customers in the testing data set may be input to the classifier. In one example, the customer account data and network event data of the testing data set may be transformed to conform to a reduced feature set and/or to conform with a hyper-dimensional space generated via PCA using the training data set. The classifier may generate an output comprising categorizations of each customer in the testing data set as belonging to either a first class or a second class. The first class may comprise, for example, customers who are similar to those customers in the training data set who called the customer call center in connection with the reason code; in other words, customers who may more likely to be suffering from the same problem underlying the reason code. The second class may comprise customers similar to those customers of the training data set who did not call the customer call center regarding the reason code (or who are dissimilar to the customers in the training data set who called the customer call center in connection with the reason code); in other words, customers who may be less likely to be suffering from the same problem underlying the reason code. The output may be compared to the known categorizations of the customers in the testing data set. For instance, the customers in the testing data set may be known to either have called the customer call center in connection with the reason code or not. Thus, a percentage accuracy score may be calculated for the classifier. In one example, if the accuracy of the classifier is less than a desired accuracy, the feature selection and/or PCA may be re-run on the training data set, or the training data set may be expanded to include network event data and customer account data for additional positive example customers, or a larger number of customers in general.

Once a classifier is generated for a particular reason code, the classifier may be applied to additional customers of the telecommunication network to classify the customers into one of two categories, e.g., customers who may be more likely to be suffering from the same problem underlying the reason code and customers who may be less likely to be suffering from the same problem underlying the reason code. In addition, customers within the first category may be identified who are determined to have a high likelihood of calling to the customer call center regarding the reason code. In one example, the likelihood of a customer calling the customer call center is quantified in a "propensity to call" score of the customer. In one example, the propensity to call score of the customer is determined based upon a number of past calls of the customer to the customer call center. For example, given a number of customers experiencing an event associated with a reason code, it may be determined what percentage of customers called the customer call center versus customers who were able to resolve the event without calling the customer call center, and whether the customer was one of those who called. In addition, the propensity to call score of a customer may be aggregated over a number of events associated with the same or different reason codes. In still another example, a propensity to call score may be based upon a number of calls to the customer call center by the customer in a given time period compared to an average number of calls per customer in the same time period, e.g., a six month time period, a one year time period, a two year time period, etc. For instance, those customers who call more often may have higher propensity to call scores than those who call fewer times.

In one example, customers who are determined to be likely to be suffering from the same problem underlying the reason code and who also have a high propensity to call the customer call center may be selected to receive preemptively customer service content, e.g., automated customer service content, in order to both help the customer resolve the problem underlying the reason code and to prevent an unnecessary call to the customer call center. In one example, a customer may be deemed to have a "high" propensity to call when the customer's propensity to call score exceeds a threshold score. In one example, the threshold score may be set to achieve a target call volume reduction at the customer call center. In one example, the threshold score may be adjusted depending upon the current call load at the customer call center, the current staffing level at the customer call center, the number of calls in the training and/or testing data associated with the reason code, and so forth. Alternatively, or in addition, customers classified by the classifier as likely to be suffering from the same problem underlying the reason code may be ranked in a list organized by propensity to call scores. Then a number of customers from the top (or bottom) of the list may be selected to receive the automated customer service content. For instance, out of 1000 customers classified by the classifier into the category, the 200 customers with the highest propensity to call scores (e.g., the top 20 percent) may be selected to preemptively receive the customer service content.

In one example, the customer service content may comprise automated customer service content (i.e., content that does not include a live agent component), such as text instructions, audio instructions, video instructions, text, audio or video tutorials, interactive troubleshooting guides, and so forth. In one example, the customer service content that is targeted to the problem underlying the reason code may be identified and selected. For instance, the telecommunication network may maintain various customer service pieces of content in a data repository where the customer service content may be identified as being associated with one or more reason codes. The telecommunication network service provider may add customer service content on an ongoing basis and the data repository may continue to grow with new and additional customer service content.

In one example, different types of customer service content that are associated with the same reason code may be available. For instance, there may be text/picture instructions and video instructions addressing how to resolve an underlying problem associated with a reason code. In addition, in one example, there may be several modes of communication which may be used to provide the customer service content to the customers who are selected to receive the customer service content. In one example, either or both of the types of customer service content, and the mode of communication may be selected in accordance with a customer preference. For instance, when establishing a new account or at any time during the relationship with the customer, the telecommunication network may receive an indication from the customer of a preference for being contacted via particular modes of communication. For example, the customer may notify the telecommunication network of a preference to receive emails and text messages, but not phone calls. The customer may also provide an indication of a preference for video customer service content as compared to text-based customer service content. Alternatively, or in addition, the preferences of the customer may be determined from past attempts to provide customer service content to the customer. For instance, the telecommunication network may track a success rate of past instances where customer service content was pushed to the customer. For example, it may be determined that the customer typically ignores text messages that provide or notify the customer of customer service content, but that the customer typically does engage with the customer service content that is delivered via email. Thus, moving forward, the telecommunication network may select to provide the customer service content to the customer via email based upon the user preference that is determined.

It should be noted that a similar process may be followed to generate different classifiers for different reason codes, to identify customers who may be likely to be suffering from the same problems underlying the reason codes, and to provide the automated customer service content to those customers who are identified and who are also considered to be the most likely to call the customer call center. In addition, examples of the present disclosure may continuously refresh the set of shared traits associated with a reason code through remodeling. For instance, as time progresses, the training data and/or testing data may be replaced with new network event data, new or updated customer account data, and so forth, or the training data and/or testing data may be expanded to include the additional network event data, new or updated customer account data, and so forth.

It should also be noted that in other, further, and different examples, variations of one or more of the above described operations may be implemented in accordance with the present disclosure. For example, a decision tree algorithm may be used instead of a SVM-based binary classifier. In another example, a binary k-nearest neighbor algorithm may be utilized. In still another example, the present disclosure may utilize a clustering algorithm over positive examples and generate a vector in a hyper-dimensional space representing the average of the positive examples. In other words, the vector may represent the set of shared traits. Classification of additional customers may then comprise generating a vector representing the customer traits of the customer, and calculating a Euclidean distance or cosine distance/similarity from the vector representing the set of shared traits. In one example, customers for which the distance calculated is less than a threshold distance may be considered to be likely to be suffering from the same problem underlying the reason code. Thus, these and other modifications are all contemplated within the scope of the present disclosure. In all of the foregoing examples, an end result is the identification customers who may be experiencing a customer event and who are likely to call a customer call center as a result, and pushing customer service content to the customers in order to both to help the customers resolve the customer event and to prevent unnecessary calls to the customer call center. These and other aspects of the present disclosure are discussed in greater detail below in connection with the examples of FIGS. 1-3.

To aid in understanding the present disclosure, FIG. 1 illustrates an example system 100 comprising a plurality of different networks for supporting the delivery of customer service content associated with a reason code, in accordance with the present disclosure. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, 121-123, and telecommunication service provider network 150 relating to voice telephone calls, communications with web servers via the Internet 160, organization network 130, and so forth. Access networks 110 and 120 may also transmit and receive communications between endpoint devices 111-113, 121-123 and other networks and devices via Internet 160. For example, one or both of access networks 110 and 120 may comprise an ISP network, such that endpoint devices 111-113 and/or 121-123 may communicate over the Internet 160, without involvement of telecommunication service provider network 150.

Endpoint devices 111-113 and 121-123 may each comprise a telephone, e.g., for analog or digital telephony, a mobile device, a cellular smart phone, a laptop, a tablet computer, a desktop computer, a plurality or cluster of such devices, and the like. In one example, any one or more of endpoint devices 111-113 and 121-123 may further comprise software programs, logic or instructions for providing a customer service interface in accordance with the present disclosure, e.g., to facilitate receiving and responding to customer satisfaction surveys of the telecommunication service provider network 150 and to interact with customer service agents, e.g., through text message chats, multimedia chats, interactive forms, and so forth, in addition to landline or cellular telephony or voice communications.

In one example, the access networks 110 and 120 may be different types of access networks. In another example, the access networks 110 and 120 may be the same type of access network. In one example, one or more of the access networks 110 and 120 may be operated by the same or a different service provider from a service provider operating telecommunication service provider network 150. For example, each of access networks 110 and 120 may comprise an Internet service provider (ISP) network, a cable access network, and so forth. In another example, each of access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network functions, e.g., of a public land mobile network (PLMN)-universal mobile telecommunications system (UMTS)/General Packet Radio Service (GPRS) core network, or the like. In still another example, access networks 110 and 120 may each comprise a home network, and office network, or the like, which may include a gateway, which receives data associated with different types of media, e.g., television, phone, and Internet, and separates these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs) and/or home networks, and the like.

In one example, organization network 130 may comprise a local area network (LAN), or a distributed network connected through permanent virtual circuits (PVCs), virtual private networks (VPNs), and the like for providing data and voice communications. In one example, organization network 130 links one or more endpoint devices 131-134 with each other and with Internet 160, telecommunication service provider network 150, devices accessible via such other networks, such as endpoint devices 111-113 and 121-123, and so forth. In one example, endpoint devices 131-134 may comprise devices of organizational agents, such as customer service agents, or other employees or representatives who are tasked with addressing customer-facing issues on behalf of the organization that provides organization network 130. In other words, in one example, organization network 130 may comprise a customer call center. In one example, endpoint devices 131-134 may each comprise a telephone for analog or digital telephony, a mobile device, a cellular smart phone, a laptop, a tablet computer, a desktop computer, a bank or cluster of such devices, and the like.

In one example, any one or more of endpoint devices 131-134 may comprise software programs, logic or instructions for providing a customer service interface for facilitating interactive customer service communications between customers and customer service agents, e.g., as an alternative or in addition to telephony or voice communications. In this regard, voice calls and interactive chat conversations between customers and organizational agents may be facilitated via one or more of telecommunication service provider network 150 and Internet 160. In one example, organization network 130 may also include an application server (AS) 135. In one example, AS 135 may comprise a computing system, such as computing system 400 depicted in FIG. 4, and may be configured to provide one or more functions for delivering customer service content associated with a reason code, in accordance with the present disclosure. For example, AS 135 may be configured to perform one or more steps, functions, or operations in connection with the example method 200 described below.

In addition, it should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

In one example, organization network 130 may be associated with the telecommunication service provider network 150. For example, the organization may comprise the telecommunication service provider, where the organization network 130 comprises devices and components to support customer service representatives, and other employees or agents performing customer-facing functions. For instance, endpoint devices 111-113 and 121-123 may comprise devices of customers, who may also be subscribers in this context. In one example, the customers may call or engage in text or multimedia based chat conversations via endpoint devices 111-113 and 121-123 with customer service representatives using endpoint devices 131-134.

In one example, the system 100 may also include one or more servers 136 and/or one or more servers 155 in organization network 130 and telecommunication service provider network 150, respectively. In one example, the servers 136 and/or 155 may each comprise a computing system, such as computing system 400 depicted in FIG. 3, and may be configured to host one or more centralized system components for supporting the delivery of customer service content associated with a reason code. For example, a first centralized system component may comprise a database of assigned telephone numbers, a second centralized system component may comprise a database of customer account data for all or a portion of the customers/subscribers of the telecommunication service provider network 150, a third centralized system component may comprise a cellular network service home location register (HLR), e.g., with current serving base station information of various subscribers, and so forth. Other centralized system components may include a billing system, a customer relationship management (CRM) system, a trouble ticket system, an inventory system (IS), an ordering system, an enterprise reporting system (ERS), an account object (AO) database system, and so forth. The centralized system components may also include an interactive voice response (IVR) system which may receive customer calls, e.g., prior to being connected to a live agent, and/or a call center server or call management system integrating IVR functionality with automatic call distribution, call logging, call record creation and tagging, and so forth. It should be noted that in one example, a centralized system component may be hosted on a single server, while in another example, a centralized system component may be hosted on multiple servers, e.g., in a distributed manner.

In accordance with the present disclosure, AS 135 may collect call records for calls to the organization network 130, e.g., customer service calls. For instance, one or more of the servers 136 may comprise a call management system integrating IVR functionality with automatic call distribution, call logging, call record creation and tagging, and so forth. Such a call management system may generate customer service call records which store data regarding which one of endpoint devices 131-134 called and/or which customer service agent was assigned a call, a duration of the call, an indication of whether the issue the customer called about was resolved during the call, and a reason code for the call. AS 135 may utilize the call records for customer service calls to identify customers placing calls associated with a particular reason code, and to then create a set of shared traits among such customers based upon customer account data and network event data associated with the customers.

In this regard, AS 135 may also collect network event data and customer account data from one or more centralized system components (e.g., servers 155 and/or servers 136) for customers associated with endpoint devices 111-113 and 121-123. For example, the network event data from a trouble ticket system may include: information regarding trouble tickets generated with respect to telecommunication services for the customer, e.g., the number of tickets in a given time period, the time to resolve each of the trouble tickets, the number of times the customer was contacted in order to resolve each of the trouble tickets, the number of times the customer called in connection with resolving the trouble ticket, and so forth. Other types of network event data may include excess network resource utilization (e.g., excess voice usage, excess text or multimedia message usage, excess data usage, excess bandwidth usage, and so forth). Similarly, the customer account data from a CRM system may include contract end dates for various customers, while the customer account data from a billing system may include a contractual shortfall amount for a customer for a given billing period.

In addition, in one example, AS 135 may also interact with endpoint devices 111-113 and 121-123 to provide surveys and to receive responses to questions within the surveys. The surveys may inquire as to customers' level of satisfaction with various aspects of the services provided to the customers by the telecommunication service provider network. In one example, the surveys may ask whether a customer has experienced any of a number of particular problems within a given time period, such as whether the customer has experienced a loss of service for greater than six hours within the last three months, whether the customer has had a service problem that required more than two phone calls with technical support personnel in order to resolve, whether the customer has incurred overage charges, shortfall charges, and so forth. The surveys may be in an electronic format, such as extensible markup language (XML) form based surveys and/or interactive webpages, or may be presented via automated phone calls to endpoint devices 111-113 and 121-123. For instance, in one example, AS 135 may comprise an interactive voice response (IVR) system. In one example, the customers' survey responses may comprise additional customer account data.

AS 135 may utilize the customer account data and network event data associated with a customer to build a set of customer traits, i.e., a customer profile, for the customer, and to build a set of shared traits among a plurality of customers who have contacted/called the organization network 130 in connection with a reason code. In one example, the centralized system components may forward the network event data and customer account data to AS 135 on a periodic basis, when a certain quantity of data has been collected and is ready to transmit, or on some other basis. Alternatively, or in addition, AS 135 may query the centralized system component(s), e.g., periodically or on some other basis, in order to retrieve the network event data and customer account data.

As stated above, AS 135 may utilize the call records for customer service calls to identify customers placing calls associated with a particular reason code. AS 135 may further create a set of shared traits among such customers based upon customer account data and network event data associated with the customers, generate customer profiles for additional customers, determine whether the customer profiles match the set of shared traits, and deliver customer service content (e.g., automated customer service content) to devices of the customers whose customer profiles match the set of shared traits and who have propensity to call scores that exceed a threshold. For example, AS 135 may utilize the call records for customer service calls to further generate a "propensity to call" score for various customers of the telecommunication service provider network 150. In one example, the propensity to call score of the customer may be determined based upon a number of past calls of the customer to the organization network 130 as compared to other customers within a same time period. These and other example operations for delivering customer service content associated with a reason code are described in greater detail below in connection with the example of FIG. 2. In addition, it should be realized that the system 100 may be implemented in a different form than that illustrated in FIG. 1, or may be expanded by including additional endpoint devices, access networks, network elements, application servers, etc. without altering the scope of the present disclosure.

Figure 2:
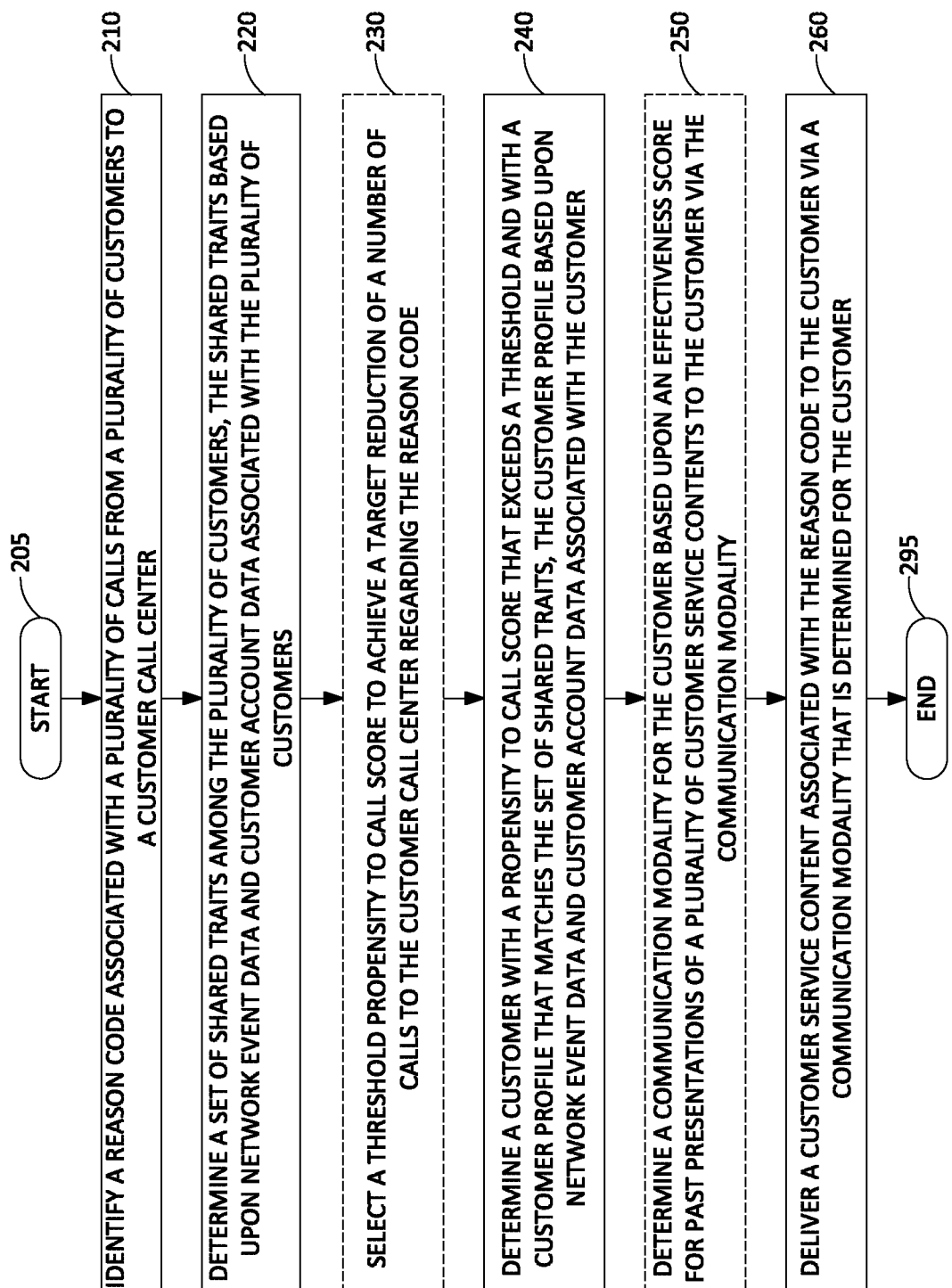
FIG. 2 illustrates a flowchart of an example method for delivering customer service content associated with a reason code.

FIG. 2 illustrates an example flowchart of a method 200 for delivering customer service content associated with a reason code. In one example, the steps, operations, or functions of the method 200 may be performed by any one or more of the components of the system 100 depicted in FIG. 1. For instance, in one example, the method 200 is performed by the application server 135, or by application server 135 in conjunction with other components of the system 100. Alternatively, or in addition, one or more steps, operations or functions of the method 200 may be implemented by a computing device having a processor, a memory and input/output devices as illustrated below in FIG. 3, specifically programmed to perform the steps, functions and/or operations of the method. Although any one of the elements in system 100 may be configured to perform various steps, operations or functions of the method 200, the method will now be described in terms of an example where steps or operations of the method are performed by a processor, such as processor 302 in FIG. 3.

The method 200 begins at step 205 and proceeds to step 210. At step 210, the processor identifies a reason code associated with a plurality of calls from a plurality of customers to a customer call center. In one example, records of the plurality of calls may be received from a call center server or a call management system integrating interactive voice response (IVR) functionality with automatic call distribution, call logging, call record creation and tagging, and so forth. In one example, records of the plurality of calls may be tagged with the reason code by an IVR system or other component of a call center server or call management system, or by a customer service agent of the customer call center. Thus, calls to the customer service center associated with the reason code may be identified through the records of such calls, which may include a tag of the particular reason code. In one example, the reason code may be identified when a number of calls to the customer call center that are tagged with the reason code and which are received at the customer call center within a given time period exceeds a threshold. In another example, the reason code may be identified when a number of calls to the customer call center that are tagged with the reason code is greater than a number of calls to the customer call center that are tagged with a different reason code. For example, one or more reason codes may be targeted for a call volume reduction at the customer call center if the reason code(s) is/are associated with more calls to the customer call center than other reason codes.

At step 220, the processor determines a set of shared traits among the plurality of customers, the shared traits based upon first network event data and first customer account data associated with the plurality of customers. In one example, the set of shared traits is used in a classifier, e.g., binary classifier, such as a support vector machine (SVM), a ternary classifier, or the like for determining whether the customer profile matches the set of shared traits. In one example, the determining the set of shared traits may include training the binary classifier. For instance, the first network event data and the first customer account data may be used as training data for a binary classifier. In one example, the determining the set of shared traits may further include testing the binary classifier. For instance, the first network event data and the first customer account data may further be used as testing data for the binary classifier (where the testing data may be associated with calls to the customer call center associated with the reason code that are from different customers than the customers whose calls are associated with the training data).

The network event data and the customer account data may be obtained from various sources such as call detail records (CDRs), logs, reports, and the like for data calls and cellular and/or landline telephone calls, collected from various network elements, such as edge routers, gateways, domain name system (DNS) servers, and so forth, trouble ticket system reports, billing system reports, provisioning system reports, and so forth, or aggregate records created from the foregoing types of logs, reports, records, and the like. Network event data may also be collected from devices at the customer premises, such as gateways, routers, set top boxes, and so forth. Thus, the network event data may include call detail records (CDRs), trouble ticket system reports, billing system reports, provisioning system reports, television viewing records, or clickstream records, and so forth. In one example, the customer account data comprises records storing customer characteristics of the customers that include at least one of: a name, an age, an address, subscription information, identifications of customer devices, billing history, payment history, purchasing and ordering information, or the like. However, it should be noted that the examples of various customer traits, e.g., network event data and customer account data, are provided for illustrative purposes only. Thus, other, further, and different examples in accordance with the present disclosure may categorize various types of customer traits in a different manner.

In one example, the determining the set of shared traits comprises performing a feature selection over a plurality of customer traits. For example, the plurality of customer traits may include the first network event data and the first customer account data. In addition, a customer trait with a greater number of positive examples for a customer placing a call associated with the reason code to the customer call center may be selected for inclusion in the set of shared traits over a customer trait with fewer positive examples. In one example, the customer profile is generated by selecting the second network event data and the second customer account data to include in the customer profile. For instance, the second network event data and the second customer account data may comprise customer traits that correspond to the set of shared traits. For instance, the feature selection may involve determining that customer traits of "zip code" and "device type" may be most useful in identifying other customers who may have similarities to those customers who have already called regarding the reason code. Thus, for example, customer traits, or "features," with higher number of positive examples within the training data set may be selected for inclusion into the set of shared traits over customer traits with fewer or no positive examples. For instance, in the present examples, zip code and device type may be represented as dimensions, while other customer traits with few or no positive examples may be omitted. In one example, a hyperplane in the multi-dimensional space may be generated which defines a boundary that may be used to determine whether a customer profile matches or does not match the set of shared traits. Alternatively, or in addition, principal component analysis (PCA) may be applied to the training data set as part of the generating of the binary classifier. For instance, PCA may be applied to a hyper-dimensional space of all of the possible features (e.g., customer traits) that may comprise the set of shared traits. In another example, PCA may be applied to a hyper-dimensional space based upon a reduced feature set, e.g., generated via feature selection.

In still another example, the determining the set of shared traits may include generating a first multi-dimensional vector having a plurality of dimensions. For example, a value of the first multi-dimensional vector associated with one of the plurality of dimensions may represent an average, a mean, or a median value over all positive example customers for a shared trait of the set of shared traits, and so on for other values representing other shared traits of the set of shared traits. In one example, the plurality of dimensions may be selected in accordance with a feature reduction, e.g., as described above.

At optional step 230, the processor may select a threshold for a customer "propensity to call." In one example, the threshold is selected to achieve a target reduction of a number of calls to the customer call center regarding the reason code. In one example, the threshold may be adjusted depending upon the current call load at the customer call center, the current staffing level at the customer call center, the number of calls in the training and/or testing data associated with the reason code, and so forth.

At step 240, the processor determines a customer with a propensity to call score that exceeds a threshold and with a customer profile that matches the set of shared traits. In one example, the customer profile is based upon second network event data and second customer account data associated with the customer. The second network event data and the second customer account data may be obtained from the same types of sources mentioned above with respect to the first network event data and first customer account data.

In one example, step 240 may include feeding a plurality of customer traits of the customer, i.e., the second network event data and second customer account data, as inputs to a binary classifier trained and tested in accordance with the first network event data and first customer account data. In one example, the second network event data and second customer account data may be represented as a vector or a point within a multi-dimensional space, where a determination of whether the customer profile matches the set of shared traits may be based upon the side of a hyperplane upon which the point or vector falls.

In another example, step 240 may include the processor generating a second multi-dimensional vector having the plurality of dimensions. In one example, a value of the second multi-dimensional vector associated with one of the plurality of dimensions represents a customer trait of the customer profile corresponding to the set of shared traits. Accordingly, in one example the customer profile is determined to match the set of shared traits when a distance, e.g., a Euclidean distance or cosine distance/similarity, between the second multi-dimensional vector and a first multi-dimensional vector representing the set of shared traits is less than a threshold distance.

In one example, the threshold may be a threshold propensity score. In another example, the threshold may be a threshold rank or position within a list of customers. For example, a plurality of customers may be identified with customer profiles that match the set of shared traits, e.g., customers who are deemed likely to be suffering from the same problem underlying the reason code. In one example, the plurality of customers that are identified may then be ranked in a list organized by propensity to call scores. Then, a number of customers with the highest propensity to call scores (e.g., the top 50, the top 100, the top 20 percent, the top 25 percent, etc.), may be selected to receive the automated customer service content.

At optional step 250, the processor may determine a communication modality for the customer. For instance, the communication modality may be used to deliver a customer service content to the customer. The communication modality may be selected from among several available modalities, which may include: an email, a short message service (SMS) message, a multimedia messaging service (MMS) message, a social media post, an automated voice message, a video message, and so forth. In one example, the communication modality is determined based upon an effectiveness score for past presentations of a plurality of customer service contents to the customer via the communication modality. For example, the processor may track a success rate of past instances where customer service content was pushed to the customer. For example, each piece of customer service content may be tagged to determine if the customer that is provided the customer service content acts upon the customer service content. For example, it may be determined that a customer typically ignores text messages that provide or notify the customer of customer service content, but that the customer typically does engage with the customer service content that is delivered via email. For instance, it may be tracked whether the customer acts upon a hyperlink presented in the email to access the customer service content which may be stored on a web server. Thus, moving forward, the processor may select to provide the customer service content to the customer via email based upon a determination that email delivery of customer service content has a higher effectiveness score, or success rate, as compared to other modalities for delivery of customer service content.

At step 260, the processor delivers a customer service content associated with the reason code to the customer via a communication modality that is determined for the customer. For example, the communication modality may be determined at optional step 250. The customer service content may be retrieved from a data repository of the telecommunication service provider network where the customer service content may be identified as being associated with one or more reason codes. The telecommunication network service provider may add customer service content on an ongoing basis and the data repository may continue to grow with new and additional customer service content. In one example, different types of customer service content that are associated with the same reason code may be available. For instance, there may be text/picture instructions and video instructions addressing how to resolve an underlying problem associated with a reason code. Accordingly, in one example, the processor may further select the type of customer service content, e.g., based upon a compatibility with the communication modality that is determined for the customer and/or based upon a customer preference for the type of customer service content.

Following step 260, the method 200 proceeds to step 295 where the method ends. It should be noted that the method 200 may be expanded to include additional steps, or to include modification or additions to the steps recited. For example, steps 220 and 240 may be expanded to include third party data as an additional source of customer traits for the set of shared traits and/or for the customer profile. In another example, a decision tree algorithm may be trained at step 220 and used for classification at step 240, e.g., instead of a SVM-based binary classifier. In still another example, a binary k-nearest neighbor algorithm may be utilized. It should also be noted that the method 200 may continue to be repeated, e.g., with respect to the same reason code or one or more additional reason codes. For instance, the customer traits of customers calling regarding the reason code may change over time such that a matching customer profile may also change. In addition, the reason codes that are generating the most calls to the customer call center may change over time such that it may be more beneficial to target different reason codes for call volume reductions based upon the changing distribution of calls to the customer call center and/or based upon another change in circumstances.

In addition, although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted either on the device executing the method 200, or to another device, as required for a particular application. Furthermore, steps, blocks, functions, or operations in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the examples of the present disclosure.

As such, the present disclosure provides at least one advancement in the technical field of telecommunication service provider network operations. This advancement is in addition to the traditional methods of human personnel manually responding to customer complaints regarding network operations. In particular, examples of the present disclosure automatically determine a set of customer traits which are indicative of a customer who is likely to be suffering from a problem associated with a reason code, detect customers having customer profiles that match the set of shared traits and who are also determined to be likely to call a customer call center regarding the problem, and push automated customer service content to such customers in order to prevent an unnecessary call to the customer call center. This leads to more efficient operating of the telecommunication service provider network, greater customer satisfaction, and better and more efficient use of human resources within an organization.

The present disclosure also provides a transformation of data, e.g., network event data/customer account data is generated by one or more network components and/or centralized system components. In one example, the network event data/customer account data is transformed into a classifier that may be used to determine which customers have customer profiles that may match a set of shared traits. In addition, the network event data/customer account data is transformed into additional data or new data that indicates which customers may be likely to be suffering from a same problem underlying a reason code as customers who have already called in connection with the reason code, and who may have a high propensity to call a customer service center of the telecommunication service provider network.

Figure 3:
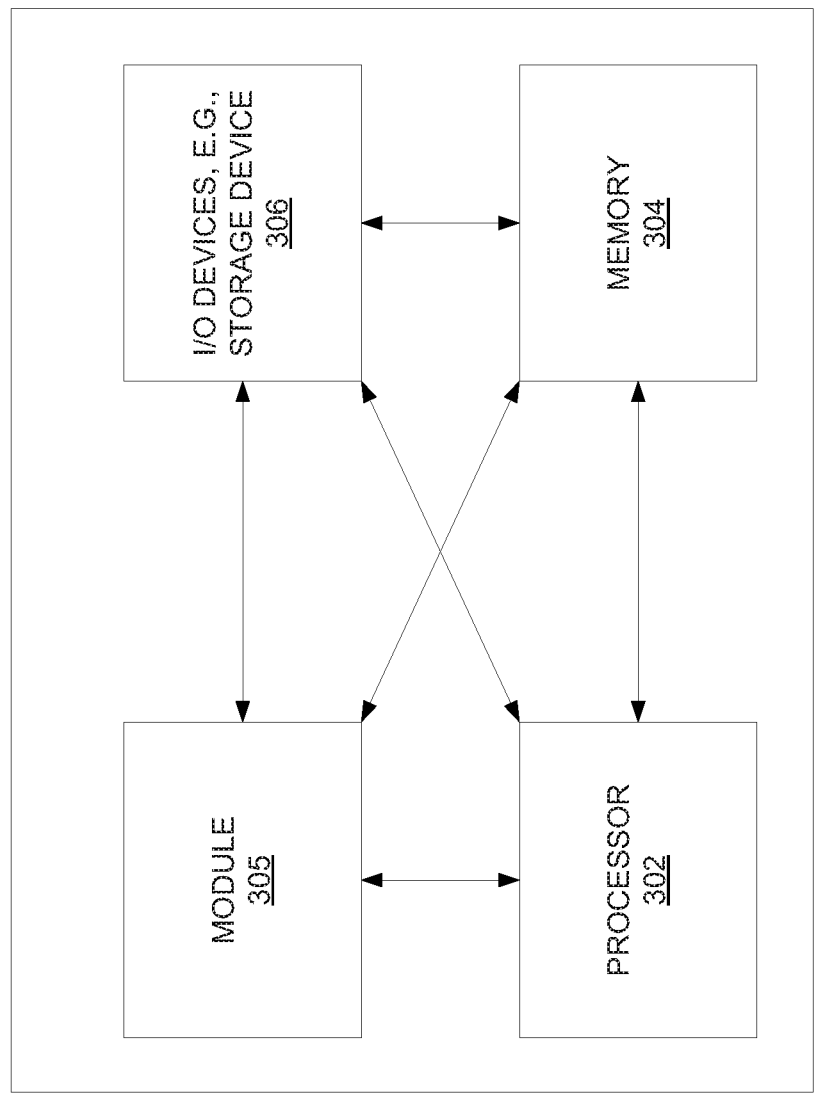
FIG. 3 illustrates a high-level block diagram of a computing device specially programmed to perform the functions described herein.

Finally, examples of the present disclosure improve the functioning of a computing device, e.g., a server. Namely, a server deployed in the telecommunication service provider network is improved by the use of network event data/customer account, which is processed via the operations of the present disclosure to deliver customer service content associated with a reason code to a customer that is determined to be likely to be suffering from a same problem underlying a reason code as customers who have already called in connection with the reason code, and who may have a high propensity to call a customer service center of the telecommunication service provider network FIG. 3 depicts a high-level block diagram of a computing device specifically programmed to perform the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for delivering customer service content associated with a reason code, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 302 can also be configured or programmed to cause other devices to perform one or more operations as discussed above. In other words, the one or more hardware processors 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 305 for delivering customer service content associated with a reason code (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for delivering customer service content associated with a reason code (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

APPENDIX

| Source Name | Description |
| --- | --- |
| Demographics | From marketing technology and services company that offers services such as demographics, propensities, behavioral analysis, etc. Includes sourcing of household, and individual subscriber data. |
| Wireless Accessory Returns COR Stores | Similar to the accessory purchase, except pulls returns instead. |
| Mobility Call Center Needs-Interactions | Contains interactions from customers logged in to system. A call is identified as an interaction (intrxn_id), while a problem is identified as a need (need_id). Call are logged real time into system's operational data store. |
| Mobility Suspension Status - Subscriber Level | Tracks subscriber level customers that are currently suspended, date of suspension and the reason e.g. non-payment, stolen phone, etc. |

APPENDIX-continued

| Source Name | Description |
| --- | --- |
| Basic Package | Contains the customer's basic package information. Each plan will have an effective date and end date. The bill code (service code or product code) should be contained in the product catalog. |
| DVR | Viewing history stored on a detailed level for a minimum of 6 months, and summary data stored for a minimum of 2 years (3-5 preferable). |
| HDTV | HDTV product offering |
| Programming | Service information, which includes optional programming |
| Carrier Billing-Recurring | Recurring charges that come through carrier billing |
| PPV | Data associated with purchases of subscriptions, PPV, on demand content, apps, equipment and other paid for inventory |
| Bill Type | Contains whether a bill is paper, e-statement, etc. |
| Demographics | demographics information |
| Carrier Billing-Purchase | Purchases made through carrier billing, primarily apps but also includes other phone charges |
| Carrier Billing-Refund | Refunds that are processed through carrier billing |
| DSL Profile | Active DSL connections combined with equivalent other plans. |
| Mobility ADD A LINE | Provides an indicator based on whether a service access identifier was added to an account on the account origination date (marked as new) or after (marked as "add a line"). This is then left joined with the device network activation where a device will be pulled if there was an activation either a day before or two weeks after the service access identifier association date. Allows a determination of what type of device was added. |
| IPTV PPV | Contains a monthly view of Pay Per View transactions for IPTV customers. |
| IPTV VOD | Contains a monthly view of video-on-demand for IPTV customers. |
| Contract | Metadata around contract for device installment plan program (customer puts a down payments and then makes monthly payments to get a device). |
| Payments | Tracks payments made towards an instalment plan. |
| Wireless Device Returns | Similar to the device purchase, except pulls returns instead. |
| COR Stores | |
| Mobility Subscription Status | data regarding, e.g., voluntary suspend or restore |
| Catalog | Contains the catalog of products, services, and features |
| Availability by Household | Whether a customer is eligible to receive services or not |
| Address ID to Customer Location Map | Address ID to customer location mapping |
| Address ID to Persona Map | Address ID to persona mapping. Persona comes from segmentation codes that exists in consumer insights. |
| Address ID to Household ID Map | Address ID to household ID mapping |
| Address ID to Service Availability | Contains satellite, IPTV, DSL Service availability by address ID. |
| Address ID Final Tuple | Contains address ID to model series ID map for all addresses across the U.S. |
| ISM Indicator | The Integrated Services Model (ISM) flag indicates that a customer as satellite and IPTV combined billing. This flag is used to route callers and chats to ISM agents who are specialized in handling combined billing customer issues. |
| Address ID to Current Service Map | Source contains the whether a customer currently has IPTV, satellite, and/or DSL by address ID. |
| Address ID to Demographics Map | The source contains demographic data by the address ID. |
| Zip Code to Agent Region Map | Contains mapping of zip code to agent region for routing DSL customers to proper DSL region agent group |
| IPTV Payments | Data on payments, the payment method, the payment amount, whether it was the full outstanding amount, the duration till the bill was due, etc. |
| Wireless Local Loop Subscriptions | Includes subscribers who subscribe to wireless local loop. |
| Wireless Local Loop Service Type Map | Contains enhancement of service type table/feed to include wireless local loop. |
| Columbus Call Rate | Columbus Call Rate: Customers who click on an article and then call customer care within 72 hours |

APPENDIX-continued

| Source Name | Description |
| --- | --- |
| Segmentation | Demographic data to understand which type of customers are known to adopt high end devices first |
| Mobility FAN | Looking for foundation account numbers that are associated to mobility accounts |
| Mobility Device Upgrade Eligibility Check | Represents when ANY channel does an upgrade eligibility check for a customer (applicable only for devices), the result of that check, and other pertinent parameters. This value is upgraded on a daily basis since upgrade eligibility is checked for each device/MRC configuration that the customer may look at. |
| Mobility Catalog | Contains all Mobility products contained within the catalog |
| IPTV Catalog | Contains all IPTV products contained within the catalog |
| Curated Content Catalog | |
| KB Article Catalog-Mobility | Source contains repository of KB articles for home solutions |
| Residential Dwelling Type | Customer's dwelling type information (unit types e.g. residential housing vs. apartment complex). |
| Device OS | Source users who have particular type of device operating system |
| DSL/POTS Service Type Indicator | Indicator that shows someone is a DSL or POTS subscriber |
| Pricing | Identify customers on various pricing structures. |
| Mobility Subscriber Group Number | Contains the group number related to a subscription. If the subscriber is part of a shared plan, this source provides the group number that subscriber is a part of. |
| IPTV Service Tenure | Bill cycle date for wireless service at subscriber or CTN level, bill cycle date for IPTV account, device order date for each of the wireless subscribers associated with the wireless account, service order date at service level (HSIA, VOIP, IPTV), IPTV service installation date at each service level associated with the account. Tenure states for IPTV: pre-install, first bill, life cycle (early life cycle, mature life cycle), good bye at service level, Tenure states for wireless: similar to above. |
| Clickstream Profile: COM Clickstream Profile | Entry page, referral site, duration of session, exit page, % time on shop pages, % time on support pages, % time wireless support, % time IPTV support, % time search pages, % time wireless, % time wireless device, % time smartphone, % time tablet, % time emerging device, % time other device, % time plans, % time features, % time prepaid device, % time prepaid plan, % time prepaid, % time IPTV, % time HSIA, % time VoIP, % time DSL, % time DTV, % time other wireline. |
| Wireless Data Plans-Mobile Share Data | Mobile Share wireless data plans start and end dates, product description, product rate amount. |
| Mobility Bill | Monthly billing statements for mobility will describe components of a customer's bill aggregated on a monthly level. Main focus is on charges to the user, but some usage can also be derived. |
| HSIA | Contains the High Speed Internet plans held by a customer, including a link to the catalog. Each plan will have a start and end date. End dates of 12/31/9999 identify an active plan. An account can only have one active plan at a time |
| Programming | Programming, also known as bolt-ons, can have a complex 'association' relationship where some bolt-ons are inclusive of others. An account can have multiple bolt-ons. |
| VoIP Usage | Calculates the total minutes used on a VoIP product within a billing cycle. |
| Apps Downloads and Usage | App download (from network provider) and usage of network provider mobile app. Taken from clickstream data on mobile app. |
| Bill Type | Contains information on the type of billing a customer has. Paperless, autopay, etc. are options. This is derived directly from IR2 STTM so any discrepancies should first be checked with modeling. If discrepancies cannot be explained then I would suggest requesting the SQL reworked. |

APPENDIX-continued

| Source Name | Description |
|---|---|
| Wireless Data Plans-Legacy Data Plans | Pulls legacy data plans; subscription start & end date, product description, product rate amount. |
| Contract | Contract information for customers, namely when they began a commitment with network provider and when that formal commitment will end. Not all customers have a contract. |
| Demographics | Contains demographic data (snapshot data, not adjusted by timeframe). |
| DVR | Contains information on STB purchases, and whether or not the STB was a DVR. |
| HDTV | Contains the HDTV Transactions held by a customer, including a link to the catalog. Each plan will have a start and end date. When compared with billing data there may be a discrepancy since HD programming results in multiple line-items on the bill so any value calculation should be derived from the bill. |
| IPTV Viewing | Contains information on the Set-Top-Box viewing activity of an account, including which channels were viewed and when. |
| Wireless Data Plans | Wireless data plan start and end dates on a subscriber level, joined to the catalog. When possible, a value has been provided for the plan limit. Billing on data plans come from two separate systems so an effort has been put in place to pull all of the plans. For data plans for smartphones/feature phones, there is an inherent error rate since there isn't a clean way to separate all data plans from other wireless services. |
| Wireless Data Usage | Tracks the amount of MB used on a wireless line, aggregated on a service access line level. This requires the service access line to have a data plan |
| Wireless Feature Transactions | Similar to the wireless data plans source, this pulls wireless features (start and end dates) for network customers. Wireless features are added services such as text, smart-limits, family map, etc. |
| Wireless Features-Add-on features | Pulls add-on features, subscription start & end date, product description, e.g., family map, mobile insurance, etc. |
| Wireless Features-International features | Pulls international features - subscription start & end date, product description, e.g., international text messaging. |
| Wireless Features-Text Features | Pulls text message features - subscription start & end date, product description. |
| Mobility Subscriber Tenure | Source contains dates that represent tenure state transitions of mobility subscriber. Tenure states are currently segmented into four buckets:<br>1. pre-install (after 1st purchase but before activation)<br>2. first bill (after activation, before second bill)<br>3. life cycle (after second bill until deactivation order)<br>4. good bye (date deactivation order is made until service is deactivated) |
| IMEI or SIM Transfer | IMEI or SIM Transfer |
| IPTV Availability Check | Looking for IPTV availability check data from the online portal. This will come from either authenticated, or prospect customers. If the check is not linked to an account, it will need to be linked to an address and (potentially) to the accounts at that address (if the check is made by current residents). Also includes the outputs of the eligibility check. |
| Promotional Pricing vs. Normal Pricing | Distinguishes between customers on normal pricing vs. a promotional (intro) pricing plan. Can also be segregated by: customer is currently on promotional pricing plan, customer is currently on normal pricing plan, customer is currently on normal pricing plan, but was on promotional pricing plan X months ago. |
| Service Tier Availability | Looking for max available speed at a given customer location |
| Discount Broadband Eligibility | Contains a flag that indicates whether a subscriber is eligible to receive discounted broadband service. |
| App Usage | Information regarding application usage on mobile devices |
| Clickstream Events: network provider web events | Source contains clickstream data with an event identifier column tagged. Events have business logic. |
| Bill & Usage | Contains bill data constructed from the detailed billing statements and aggregated to a monthly |

APPENDIX-continued

| Source Name | Description |
|---|---|
| | level. Include fields only on transactional values, promotions, etc. The other field is calculated as total-known which will results in a balanced transaction. |
| Customer Profile | Contains general profile attributes (snapshot data that cannot be time adjusted). |
| Curated Content Impressions and Clicks | Contains recommended content as well clicks on that content |
| Wireless Data Plans-Mobile Share Component | add on charge for extra device |
| Mobility Bill Type | Contains information on the type of billing a customer has. Paperless, autopay, etc. are options. |
| Mobility Demographics | Contains demographic data (snapshot data and cannot be adjusted by timeframe). |
| IPTV | Contains the IPTV plans held by a customer, including a link to the catalog. Each plan will have a start and end date. End dates of 12/31/9999 identify an active plan. An account can only have one active plan at a time. |
| VoIP | Contains the VoIP plans held by a customer, including a link to the catalog. Each plan will have a start and end date. End dates of 12/31/9999 identify an active plan. An account can only have one active plan at a time |
| Wireless Accessory Transactions-COR Stores | This source includes accessory transactions that occurred at Corporate Operated Stores (COR). |
| Wireless Accessory Transactions-Online | Contains information on online accessory transactions (purchased through network provider website). |
| Wireless Contract | Wireless contracts pertain directly to an agreement to stay with network provider for x amount of months. Contracts are both device and service plan agnostic, but often times have minimum requirements). |
| Wireless Device Transactions-COR Stores | data from Point of Sale system used by corporate operated stores (COR). Includes device transactions that occurred at these stores. It also includes if the transaction was an up/downgrade. |
| Wireless Device Transactions-Network Activations | Tracks network device activity for a subscriber and looks for new IMEI (unique device identifiers). Devices have also been classified into different categories. This table does not represent transactions, but does represent what device a customer had when. This would capture these devices regardless if they were purchased through an network provider or elsewhere. |
| Wireless Device Transactions-Online | Contains information on online device transaction (purchased through network provider). Additional information includes whether the purchase was an upgrade, add a line, etc. |
| Wireless Non-Phone Data Plans | Similar to the data plans source, but with a focus on non-phone devices. This would include hotspots, tablets, etc. |
| Wireless Voice Plans | Contains information on wireless voice plans, including the start and end dates of these voice plans for that subscriber. |
| Wireless Voice Usage | Tracks the amount of minutes used on a wireless line, aggregated on a service access line level. This requires the service access line to have a voice plan. |
| Clickstream Search: network provider website | Contains data on events that occur on the search portions of network provider website. |
| Clickstream Pages: network provider online shop | Contains data on events that occur on the shop portions of network provider website. |
| Clickstream Pages: network provider website support pages | Contains data on events that occur on the online support portions of network provider website. |
| Wi-Fi Enabled Device Purchases | Device purchases with Wi-Fi enabled. |
| Mobility Customer Care Call Center | Contains interactions from logged in customers. A call is identified as an interaction (intrxn_id), while a problem is identified as a need (need_id). Call are logged real time into operational data store. Then, the logs are posted within a few seconds to reporting instance. |

APPENDIX-continued

| Source Name | Description |
| --- | --- |
| Wireless Non Phone Data-Non-phone Data Plans | Wireless data plans for non-phone devices, e.g., tablets, etc. Pulls the subscription data plan start & end date, data plan description and data amount for plan. |
| Microcell Transactions | Contains microcell transactions |
| Wireless Purchases | Source contains wireless purchases |
| Customer Location to Email Address Map | Acquire email addresses of customers from member profile system. |
| Marketing Consent | Persons who agree to receive marketing emails |
| Customer Tenure | Customer's tenure state, e.g.: pre-install, first bill, early lifecycle <30 days, mature life cycle >30 days, good bye |
| Customer Profile Wireless Subscriber Level | Contains general wireless profile attributes at the subscriber level (service access id). This is snapshot data that cannot be time adjusted. |
| Wireless Insurance Claims | A data feed for device-related insurance claims. |
| Wireless Home Phone Transaction-Online | Wireless home phone transactions from online orders. |
| Customer Location to Browser ID Map | |
| Customer Profile Wireless Account Level | Contains general wireless profile attributes at the account level (account id). This is snapshot data that cannot be time adjusted. |
| Mover Service Order | Data that is relevant to when someone has moved. |
| Clickstream Events: Move Related Events | Source contains mover related clickstream events (e.g. customers who search for move-related sites on network provider websites). |
| Wireless CDRs (All Calls) | Source contains all calls made. Source will just contain that a call was made and when. |
| Best Selling Products by Zip Code | Best selling products for zip code (e.g., aggregated over a duration of last 3 months). Can be used as recommendations. |
| Wireless Home Phone Transactions - COR Store | Wireless home phone transactions from corporate stores. |
| Mobility Payments | Data on mobility payments, the payment method, the payment amount, whether it was the full outstanding amount, the duration till the bill was due, etc. |
| Mobility Call Center Needs-Tasks | Contains tasks that are recorded in the call center system. A call is identified as an interaction (intrxn_id), while a problem is identified as a need (need_id). These calls are further divided into tasks (calls done in one sitting) and cases (issues handled over multiple calls). The primary focus of call volume reduction is tasks. |
| Data Usage Daily Consumption | Source contains daily consumption of data |
| SMS Usage Daily Consumption | Source contains daily consumption of SMS messages |
| Voice Usage Daily Consumption | Source contains daily voice consumption |
| Microcell Subscriptions | Microcell home phone subscriptions. |
| Wireless Home Phone Subscriptions | Wireless home phone subscriptions. |
| Mobile Hotspot Subscriptions | Source represents mobile hotspot subscriptions. |
| VIP Indicator | Attribute for certain customers. |
| Market Segmentation Indicator | Customers may be tagged with different market segment indicators |
| Profitability Indicator | customers may be tagged with different profitability indicators |
| Wireless CDRs (Dropped Calls) - CVR | Data on dropped calls. This is determined by an abnormal termination reason for the call. |

What is claimed is:

1. A device deployed in a telecommunication service provider network, the device comprising:

a processor; and a computer-readable storage medium storing instructions which, when executed by the processor, cause the processor to perform operations, the operations comprising:

identifying a reason code associated with a plurality of calls from a plurality of customers to a customer call center;

determining a set of shared traits among the plurality of customers, wherein the set of shared traits is based upon first network event data and first customer account data associated with the plurality of customers;

determining a customer with a propensity to call score that exceeds a threshold score and with a customer profile that matches the set of shared traits, wherein the customer profile is based upon second network event data and second customer account data associated with the customer; and delivering a customer service content associated with the reason code to the customer via a communication modality that is determined for the customer, in response to determining both that the propensity to call score exceeds the threshold score and that the customer profile matches the set of shared traits.

2. The device of claim 1, wherein the set of shared traits is used in a binary classifier to determine whether the customer profile matches the set of shared traits.

3. The device of claim 2, wherein the binary classifier comprises a support vector machine.

4. The device of claim 2, wherein the determining the set of shared traits comprises:
training the binary classifier, wherein the first network event data and the first customer account data comprise training data for the binary classifier.

5. The device of claim 4, wherein the determining the set of shared traits comprises:
testing the binary classifier, wherein the first network event data and the first customer account data further comprise testing data for the binary classifier.

6. The device of claim 1, wherein the operations further comprise:
selecting the threshold score, wherein the threshold score is selected to achieve a target reduction of a number of calls to the customer call center associated with the reason code.

7. The device of claim 1, wherein the propensity to call score of the customer is determined based upon a number of past calls of the customer to the customer call center and the customer profile.

8. The device of claim 1, wherein the operations further comprise:
determining the communication modality for the customer, wherein the communication modality is determined based upon an effectiveness score for past presentations of a plurality of customer service contents to the customer via the communication modality.

9. The device of claim 8, wherein the communication modality comprises:
an email;
a short message service message;
a multimedia messaging service message;
a social media post;
an automated voice message; or
a video message.

10. The device of claim 1, wherein both the first network event data and the second network event data comprise:
call detail records;
trouble ticket system reports;
billing system reports;
provisioning system reports;
television viewing records; or
clickstream records.

11. The device of claim 1, wherein both the first customer account data and the second customer account data comprise records storing customer characteristics of the customer that include at least one of:
a name;
an age;
an address;
subscription information;
identifications of customer devices;
a billing history;
a payment history; or
purchasing and ordering information.

12. The device of claim 1, wherein records of the plurality of calls are tagged with the reason code by an interactive voice response system or a customer service agent of the customer call center.

13. A method comprising:
identifying, by a processor of a telecommunication service provider network, a reason code associated with a plurality of calls from a plurality of customers to a customer call center;

determining, by the processor, a set of shared traits among the plurality of customers, wherein the set of shared traits is based upon first network event data and first customer account data associated with the plurality of customers;

determining, by the processor, a customer with a propensity to call score that exceeds a threshold score and with a customer profile that matches the set of shared traits, wherein the customer profile is based upon second network event data and second customer account data associated with the customer; and delivering, by the processor, a customer service content associated with the reason code to the customer via a communication modality that is determined for the customer, in response to determining both that the propensity to call score exceeds the threshold score and that the customer profile matches the set of shared traits.

14. The method of claim 13, wherein the set of shared traits is used in a binary classifier to determine whether the customer profile matches the set of shared traits.

15. The method of claim 14, wherein the binary classifier comprises a support vector machine.

16. The method of claim 14, wherein the determining the set of shared traits comprises:
training the binary classifier, wherein the first network event data and the first customer account data comprise training data for the binary classifier.

17. The method of claim 16, wherein the determining the set of shared traits further comprises:
testing the binary classifier, wherein the first network event data and the first customer account data further comprise testing data for the binary classifier.

18. The method of claim 13, wherein the customer profile is generated by selecting the second network event data and the second customer account data to be included in the customer profile, wherein the second network event data and the second customer account data comprise customer traits that correspond to the set of shared traits.

19. The method of claim 13, further comprising:
selecting the threshold score, wherein the threshold score is selected to achieve a target reduction of a number of calls to the customer call center associated with the reason code.

20. A non-transitory computer-readable storage medium storing instructions which, when executed by a processor of a telecommunication service provider network, cause the processor to perform operations, the operations comprising:
identifying a reason code associated with a plurality of calls from a plurality of customers to a customer call center;

determining a set of shared traits among the plurality of customers, wherein the set of shared traits is based upon first network event data and first customer account data associated with the plurality of customers;

determining a customer with a propensity to call score that exceeds a threshold score and with a customer profile that matches the set of shared traits, wherein the customer profile is based upon second network event data and second customer account data associated with the customer; and delivering a customer service content associated with the reason code to the customer via a communication modality that is determined for the customer, in response to determining both that the propensity to call score exceeds the threshold score and that the customer profile matches the set of shared traits.

* * * * *